No. 693,312. Patented Feb. 11, 1902.
R. E. POINDEXTER.
SAW.
(Application filed Dec 5, 1901.)
(No Model.)
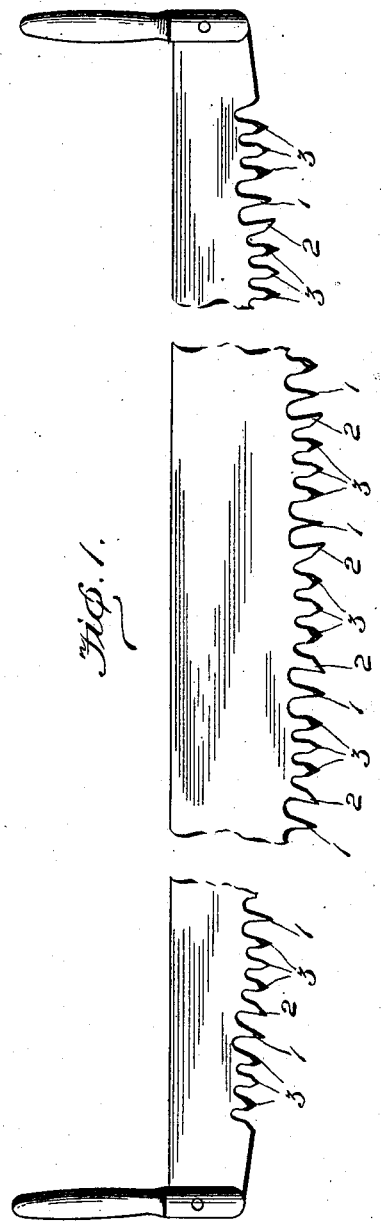
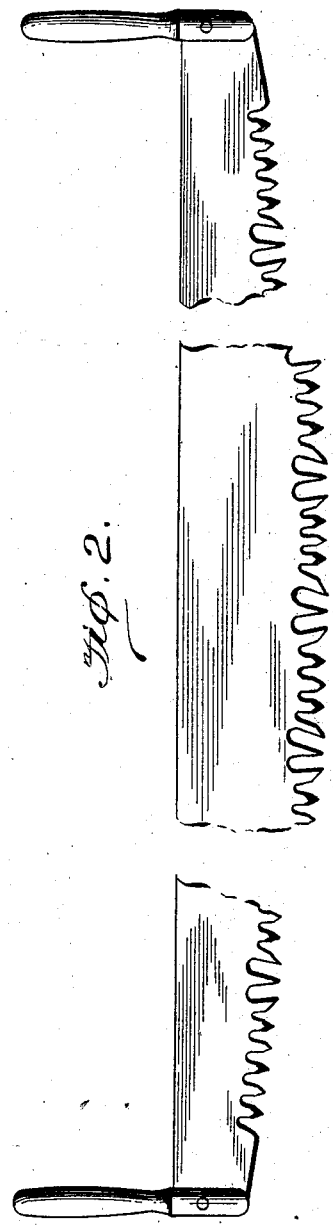
Witnesses
Bernard M Offutt
John S Brown
Inventor
Robert E. Poindexter,
by E. W. Bradford
Attorney
THE NORRIS PETERS CO., PHOTO-LITHO., WASHINGTON, D. C.

UNITED STATES PATENT OFFICE.

ROBERT E. POINDEXTER, OF INDIANAPOLIS, INDIANA.

SAW.

SPECIFICATION forming part of Letters Patent No. 693,312, dated February 11, 1902.

Application filed December 5, 1901. Serial No. 84,831. (No model.)

*To all whom it may concern:*

Be it known that I, ROBERT E. POINDEXTER, a citizen of the United States, residing at Indianapolis, in the county of Marion and State of Indiana, have invented certain new and useful Improvements in Saws, of which the following is a specification.

My said invention consists in certain improvements in the construction of saws, particularly crosscut-saws, relating especially to the form and arrangement of the teeth, whereby a very efficient and easily-operated saw is provided, as will be hereinafter more fully described and claimed.

Referring to the accompanying drawings, which are made a part hereof, and on which similar reference-numerals indicate similar parts, Figure 1 is a view of a crosscut-saw of my improved pattern, sections between the ends and middle portion being broken out to enable the parts to be shown on a larger scale, and Fig. 2 is a similar view of a modified form.

The improvement consists in the arrangement of the teeth, particularly of the drag-teeth, in relation to the cutting-teeth. In the form shown in Fig. 1 the drag-teeth 1, each of which is a plain straight tooth, as shown, are arranged between sets of cutting-teeth, the first tooth of each set which follows said drag being a chisel-tooth 2 and the others ordinary cutting-teeth 3, preferably three in number in each set or group. The center group has a chisel-tooth 2 at each end, and each group from the center toward each end of the saw has but one chisel-tooth, that being on the end of the group toward the end of the saw. A deep gullet is formed on each side of each drag-tooth 1, as shown. In Fig. 2 the construction is the same, except each group has a chisel-tooth at each end.

The operation of both forms is practically the same, as follows: The saw being dragged through a kerf or cut in the wood, the cutting-teeth in advance of the first drag-tooth cut a certain quantity of chips. The drag-tooth gathers these chips into the gullet in front of it. The chisel-tooth following is slightly longer than the drag-tooth and operates to cut into the bottom of the kerf, gathering the chips in front of it in the gullet behind the drag-tooth and leaving a clean kerf for the operation of the three cutting-teeth 3 which follow. The chips formed by these three teeth are gathered by the next drag-tooth in the gullet in front of it. The front chisel-tooth of the next group cuts down and cleans the kerf behind the drag-tooth, gathering the chips in the gullet behind the drag-tooth, as before. When the saw is dragged in the opposite direction, the other end of the saw operates in the same manner, the principal portion of the work of a saw being done by the end dragged through the wood, as is well known. However, in the construction shown in Fig. 2 the operation described takes place throughout the entire length of the saw regardless of the direction in which it is being moved. This arrangement insures a very fast-cutting and clean-cutting saw, the chip capacity being much greater than in the ordinary arrangements.

Having thus fully described my said invention, what I claim as new, and desire to secure by Letters Patent, is—

1. A saw the teeth whereof are arranged in groups with a drag-tooth between said groups, the first tooth of each group following said drag-tooth being a chisel-tooth, and said chisel-tooth being followed by ordinary cutting-teeth.

2. A saw having teeth arranged in groups with a drag-tooth between adjacent groups, a deep gullet on each side of said drag-tooth, and a chisel-tooth as the first tooth of the group following each of said drag-teeth, substantially as set forth.

3. A saw having its teeth arranged in groups with a drag-tooth between adjacent groups, the first tooth of each group following the drag-tooth being a chisel-tooth and slightly longer than said drag-tooth, substantially as set forth.

In witness whereof I have hereunto set my hand and seal, at Indianapolis, Indiana, this 25th day of November, A. D. 1901.

ROBERT E. POINDEXTER. [L. S.]

Witnesses:
H. E. SMOCK,
W. O. WILLIAMS.